United States Patent [19]

Oguma et al.

[11] Patent Number: 5,055,945
[45] Date of Patent: Oct. 8, 1991

[54] BROADCASTING COMMUNICATION APPARATUS

[75] Inventors: Shingo Oguma, Yokohama; Hideki Muroya, Ebina; Yoshitaka Iwata, Yokohama, all of Japan

[73] Assignee: Hitachi, Ltd., Tokyo, Japan

[21] Appl. No.: 476,345

[22] Filed: Feb. 7, 1990

[30] Foreign Application Priority Data

Feb. 10, 1989 [JP] Japan ................................. 1-29780

[51] Int. Cl.⁵ .......................... H04N 1/00; H04N 1/40
[52] U.S. Cl. .................................. 358/468; 358/434; 358/437; 358/438; 358/445
[58] Field of Search ............... 358/437, 438, 468, 407, 358/425, 444, 445, 408, 434, 435; 340/825, 825.03, 825.12; 375/8

[56] References Cited

U.S. PATENT DOCUMENTS 4,524,393 6/1985 Ohzeki ............................... 358/438
4,652,934 3/1987 Muroya et al. ..................... 358/445

FOREIGN PATENT DOCUMENTS

0175385 3/1986 European Pat. Off. ............. 358/444
56-48744 5/1981 Japan ................................. 358/425
0204377 11/1984 Japan .
60-32473 2/1985 Japan .
60-70876 4/1985 Japan ................................. 358/468

Primary Examiner—Benjamin R. Fuller
Assistant Examiner—Eric Frahm
Attorney, Agent, or Firm—Antonelli, Terry, Stout & Kraus

[57] ABSTRACT

A broadcasting facsimile transceiver has a transmission controller which, in the broadcasting mode, inhibits broadcasting communications during a predetermined interval of time ranging from the completion of transmission to a destination to the commencement of transmission to the succeeding destination. The transceiver also includes a scanning unit for reading a document and delivering video data, a data compression unit for compressing the video data, a memory unit for storing compressed video data from said data compression unit, a reproduction unit for reading the compressed video data stored in said memory unit, a MODEM for transmitting the video data to a communication line. The transmission controller controls the transceiver such that when reading the document, the video data read out of the scanning unit is stored in the memory unit through the data compression unit and in the broadcasting communication mode, the video data from the data reproduction unit is transmitted to the communication line through the MODEM. During a predetermined interval of time between the termination of transmission to a first destination and the commencement of transmission to a second destination, the transmission of transmission video data is inhibited to establish a reception wait state in the transceiver.

24 Claims, 12 Drawing Sheets

| TIME | 0 | 1 | 8 | 9 | 10 | 11 | 12 | 13 | 14 | 15 | 16 | 17 | 18 | 22 | 23 |
|---|---|---|---|---|---|---|---|---|---|---|---|---|---|---|---|
| TRANSMISSION WAIT TIME | 0 | 0 | 3 | 3 | 0 | 0 | 0 | 0 | 0 | 0 | 0 | -1 | 0 | 0 | 0 |

FIG. 12A IN THE CASE WHERE THE TRANSMISSION WAIT TIME IS SET TO ZERO MINUTE (ABSENCE OF THE WAIT TIME)

FIG. 12B IN THE CASE WHERE THE TRANSMISSION INTERVAL IS SET TO 10 MINUTES

BROADCASTING COMMUNICATION APPARATUS

BACKGROUND OF THE INVENTION

This invention relates to a transmission control system of a broadcasting communication apparatus, for example, a facsimile transceiver equipped with a broadcasting feature which temporarily stores transmission video data in a video data storage unit (memory) and performs sequential facsimile transmission of the transmission data to a plurality of destinations.

Generally, in the broadcasting facsimile transceiver, read-out transmission data is subjected to data compression and stored in a memory and thereafter, read out of the memory so as to be tranmitted sequentially. Such a facsimile transceiver with this broadcasting feature is disclosed in JP-A-59-204377, JP-A-60-32473 and U.S. Pat. No. 4,652,934.

In the prior art broadcasting facsimile transceiver, the facsimile transmissions of transmission video data to a plurality of destinations are carried out continuously.

More specifically, when a facsimile transmission to the first destination is completed, a facsimile transmission to the second destination is immediately carried out and thereafter, a similar operation is repeated sequentially until a facsimile transmission to the final destination is completed.

Figure 12A:
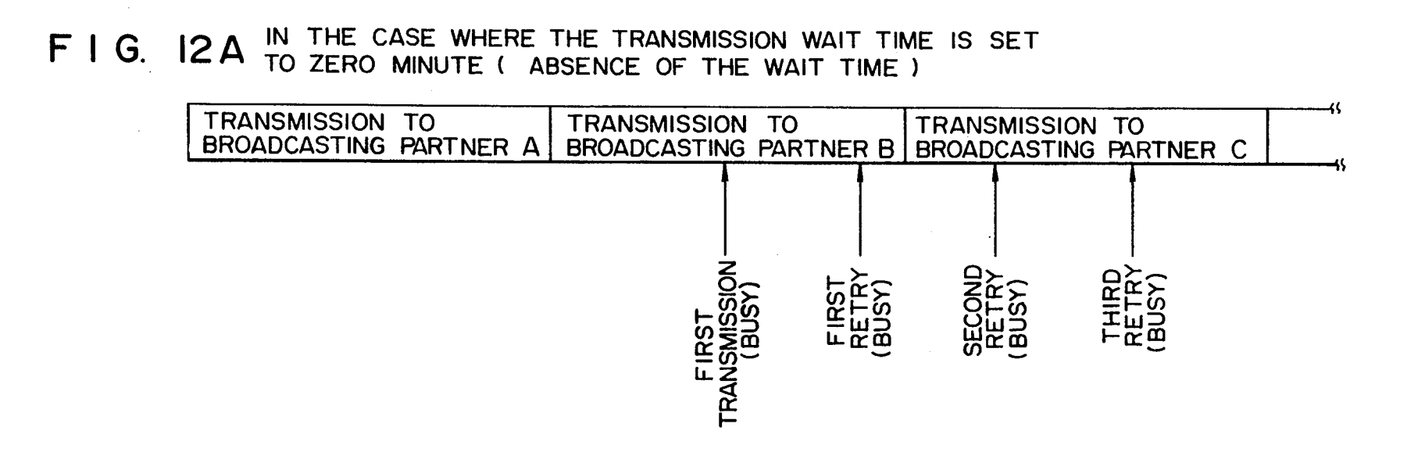
FIGS. 12A and 12B show time charts useful to explain the communication state occurring when a facsimile transceiver of the partner (originator) has the retry function.

Accordingly, in this broadcasting transmission mode, the facsimile transceiver can not receive video data from another transceiver before the interval ranging from the commencement to the termination of facsimile transmissions to a plurality of destinations expires. For example, while transmissions to broadcasting partners (destinations) A, B and C are carried out as shown in FIG. 12A, the facsimile transceiver can not receive video data from another facsimile transceiver and is brought into a busy state.

SUMMARY OF THE INVENTION

An object of the present invention is to provide broadcasting communication apparatus capable of receiving video data from another originator even in the broadcasting transmission mode.

According to the invention, to accomplish the above object, a facsimile transceiver comprises means for establishing, in the broadcasting transmission mode, a transmission wait state in which a transmission to a second destination is inhibited and a reception wait state in which the reception of transmission data from another originator is permitted, during for example a predetermined interval of time following the completion of transmission to a first destiantion.

Since, according to the present invention, the transmission wait time intervenes in continuous broadcasting transmission, even the facsimile transceiver and other communication apparatus operable to perform broadcasting transmission frequently can acknowledge emergency reception during the transmission wait time (transmission inhibiting time) in the broadcasting transmission mode and the busy state during transmission can be mitigated to an advantage.

DESCRIPTION OF THE PREFERRED EMBODIMENTS

Figure 1:
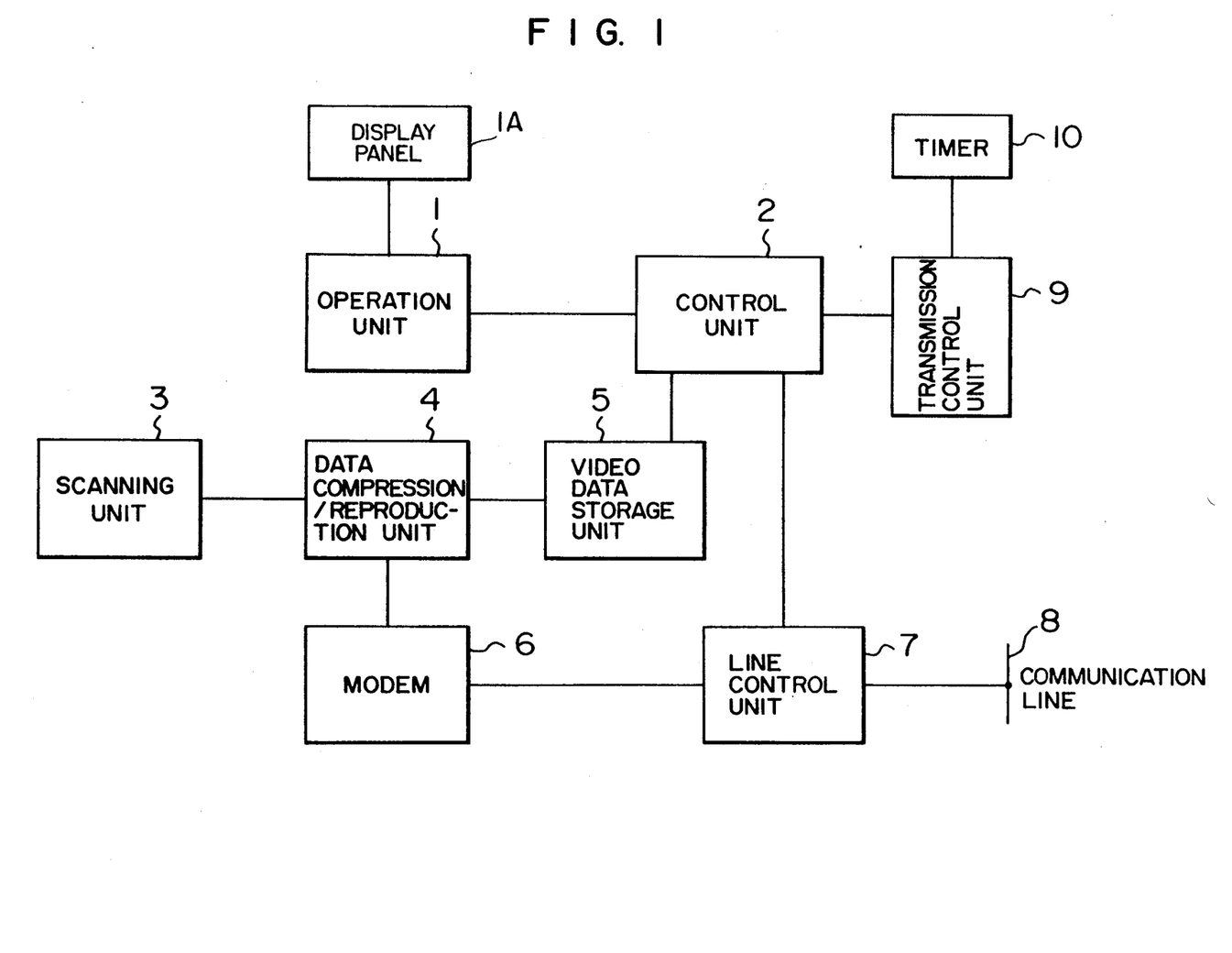
FIG. 1 is a block diagram showing a facsimile transceiver according to an embodiment of the invention.

The invention will now be described by way of example with reference to the accompanying drawings. FIG. 1 is a block diagram showing an embodiment of the invention which is applied to a facsimile transceiver. Referring to FIG. 1, reference numeral 1 designates an operation unit having operation buttons necessary for broadcasting transmission such as for example a memory transmission button, a dial button and a start button. The memory transmission button is used when video data indicative of characters in a document is temporarily stored in a memory (storage) and thereafter automatically read out of the memory for transmission. The dial button is adapted to designate a destination and the start button is adapted to start the transmission of the video data stored in the memory to the destination designated by means of the dial button. The operation unit further comprises a button used for setting a transmission wait time to be described later. The operation unit also includes a display panel 1A for displaying data related to the operation of the operation unit.

Desginated by 2 is a control unit which responds to operations of the individual buttons to control a document scanning unit 3, a video data storage unit 5 and a line control unit 7 of the facsimile transceiver. When the memory transmission button of the operation unit is depressed, the control unit 2 responds to the depression to generate a control signal to which the document scanning unit 3 and the video data storage unit 5 respond to operate themselves. More particularly, the scanning unit 3 operates to read video data in a document set at a predetermined position of the facsimile transceiver and the video data storage unit 5 operates to store the read-out video data. Denoted by 4 is a data compression/reproduction unit which is adapted to compress the read-out video data from the scanning unit 3 or reproduce data stored in the video data storage unit 5. Denoted by 6 is a MODEM (Modulator/Demodulator) unit adapted to modulate output video data from the data compression/reproduction unit 4 or demodulate transmission data from another facsimile transceiver.

The line control unit 7 is operated by receiving a control signal from the control unit 2 which responds to the operations of the dial button and start button of the operation unit 1. More specifically, the line control unit 7 receives a transmission destination designated by the dial button of the operation unit 1. With the start button once depressed, the line control unit 7 is caused to set up and confirm connection of a communication line to the designated destination and after confirmation of the connection, caused to transmit to a communication line 8 a transmission video data signal which is read out of the video data storage unit 5 and delivered via the data compression/reproduction unit 4 and MODEM 6. Here a plurality of transmission destinations can be designated. By setting a plurality of destinations by means of the dial button, the same document can be transmitted to the plurality of destinations sequentially through one operation. This operation is in general well known in the art and will not be detailed herein. The facsimile transceiver also has a receiver.

Incidentally, in the past, the transmission operation of the same video data in a document to a plurality of destinations is repeated continuously, thus raising the aforementioned problems.

The present invention intends to overcome such problems and has transmission control means for inhibiting the transmission during, for example, an interval of time which ranges from the completion of transmission to the first destination to the initiation of transmission to the second destination. This will be described below in greater detail. Referring to FIG. 1, reference numeral 9 designates a transmission control unit in which there is set a transmission inhibiting time for inhibiting the transmission operation during a predetermined interval of time between adjacent transmissions destined for desired destinations in the course of broadcasting transmission. The inhibiting time can be set through the operation unit 1 and control unit 2. Normally, the transmission control unit 9 delivers a transmission permitting command to the control unit 2.

Under this condition, when a broadcasting transmission operation is activated by means of the operation unit 1, video data is transmitted to the first destination as described previously. Upon completion of the transmission to the first destination, the control unit 2 issues a transmission control command to the transmission control unit 9. Responsive to the command, the transmission control unit 9 is brought into a transmission inhibiting state and it sends to a timer 10 a command for causing it to measure the transmission inhibiting time and to the control unit 2 a transmission inhibiting signal. Receiving the transmission inhibiting signal from the transmission control unit 9, the control unit 2 is brought into a transmission wait state. As soon as the timer has completed the measurement of the transmission inhibiting time of, for example, three minutes, the transmission control unit 9 is brought into a transmission permitting state so as to send a transmission permitting signal to the control unit 2. This permits the control unit 2 to deliver to the line control unit 7 a transmission command for the second destination. The above operation procedure repeats itself.

In this manner, the transmission inhibiting time i.e., the transmission wait time is inserted in the interval between the transmissions to the first and second destinations in the broadcasting transmission mode, thereby ensuring that transmission data from another originator (facsimile transceiver) can be received during that interval of time.

Figure 2:
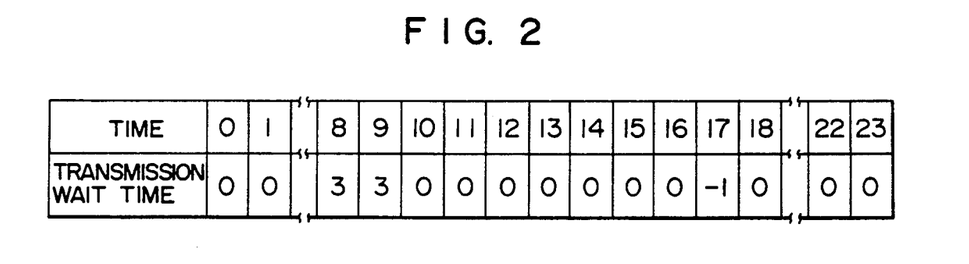
FIG. 2 shows a transmission control table.
Figure 3A:
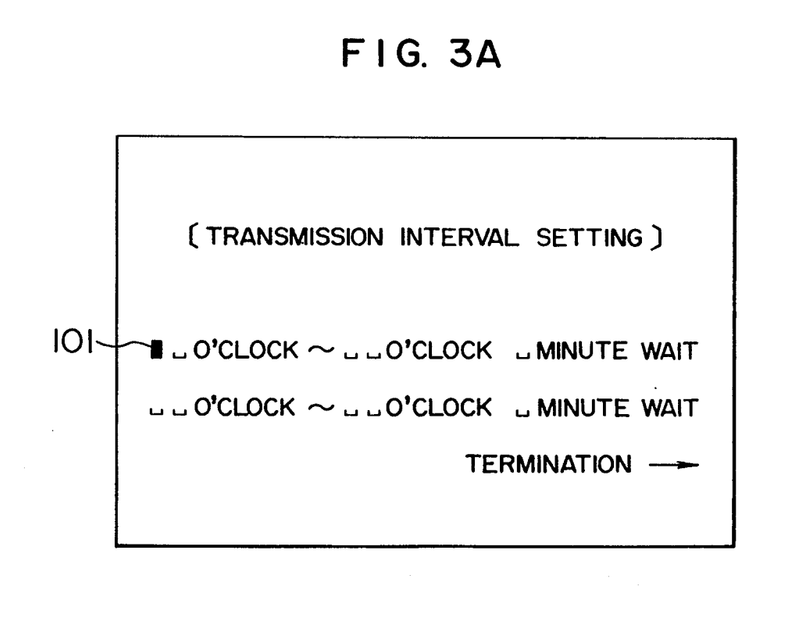
FIGS. 3A, 3B and 6A, 6B show examples of registered transmission wait time according to the invention.
Figure 3B:
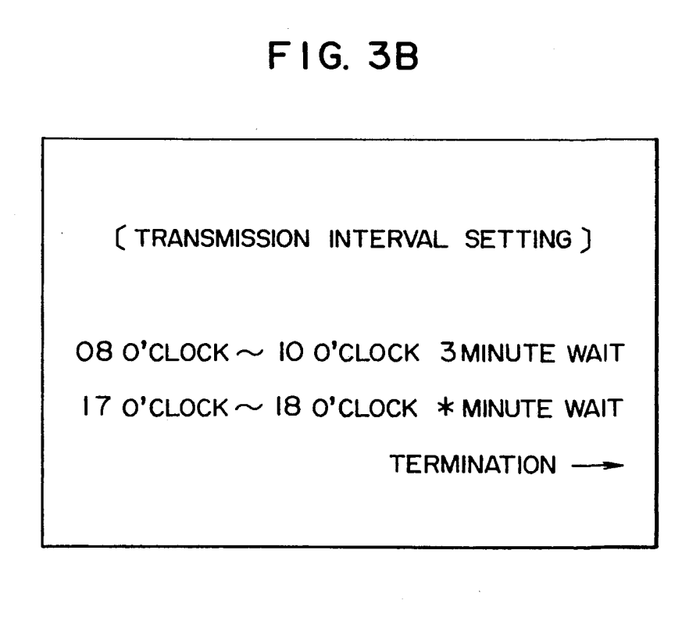

While in the foregoing embodiment the transmission inhibiting time (transmission wait time) is set equally regardless of the transmission time zone, the setting value of the transmission wait time may be varied in accordance with the transmission time zone. In this case, a transmission control table, for example, as shown in FIG. 2, may be provided in the transmission control unit 9. This transmission control table may be set by means of the operation unit 1. In the table shown in FIG. 2, the transmission wait time is set in unit of minute for individual time zones. For example, a transmission wait time of 3 minutes is set for a time zone of from 8 o'clock to 10 o'clock and "−1" representative of inhibition of all transmissions is set for a time zone of from 17 o'clock to 18 o'clock. FIG. 3A-B shows an example of the manner of setting the transmission wait time. In this example, when the facsimile is set to the transmission interval setting mode, a display as shown in FIG. 3A is displayed on the display panel 1A of the operation unit 1, thus asking the operator to input a time zone in which the transmission is desired to be controlled and a transmission wait time (a transmission inhibiting time between the preceding and succeeding transmission). An input requested portion is indicated by a cursor 101. On the basis of this input request, the transmission wait time is set to 3 minutes for a time zone of from 8 o'clock to 10 o'clock and all transmissions are inhibited for a time zone of from 17 o'clock to 18 o'clock (hereinafter this time zone is called a transmission inhibiting time zone), as shown in FIG. 3B. Thereafter, a setting completion button on the operation unit 1 is depressed to set the transmission wait time for the individual time zones in the transmission control table shown in FIG. 2. In the display shown in FIG. 3B, * mark indicates a transmission wait time of oo by which all transmissions in the corresponding time zone are inhibited.

When the transmission wait time is set in this manner and broadcasting transmission is carried out, video data is first stored in the video data storage unit 5 as in the previous embodiment and thereafter it is confirmed that the transmission control unit 9 is in the transmission permitting state and a transmission to the first destination is effected. After the completion of this transmission, the control unit 2 delivers a transmission control command so that the transmission control unit 9 is brought into the transmission inhibiting state and at the same time it reads the present time from the timer 10, derives a transmission wait time associated with the present time from the transmission control table shown in FIG. 2, and delivers to the timer 10 a command which instructs it to measure the transmission wait time. For example, with the transmission control table set as shown in FIG. 2, when the present time is 9.30, the timer 10 is so instructed as to measure a transmission wait time of 3 minutes. Thereafter, as in the case of the previous embodiment, as soon as the transmission control unit 9 has been brought into the transmission permitting state, a transmission to the second destination is commenced.

In addition, each time that the present time coincides with each o'clock and zero minute the transmission control unit 9 looks up a value of the transmission control table for a time zone including the present time and a value of the transmission control table for the one preceding time zone so as to be brought into the transmission inhibiting state when the value of the transmission control table for the present time is "−1" and brought into the transmission permitting state when the value of the transmission control table for the one preceding time zone is "−1" but the value of the control table for the present time is other than "−1". By this processing, the transmission inhibiting time can be controlled.

Figure 4:
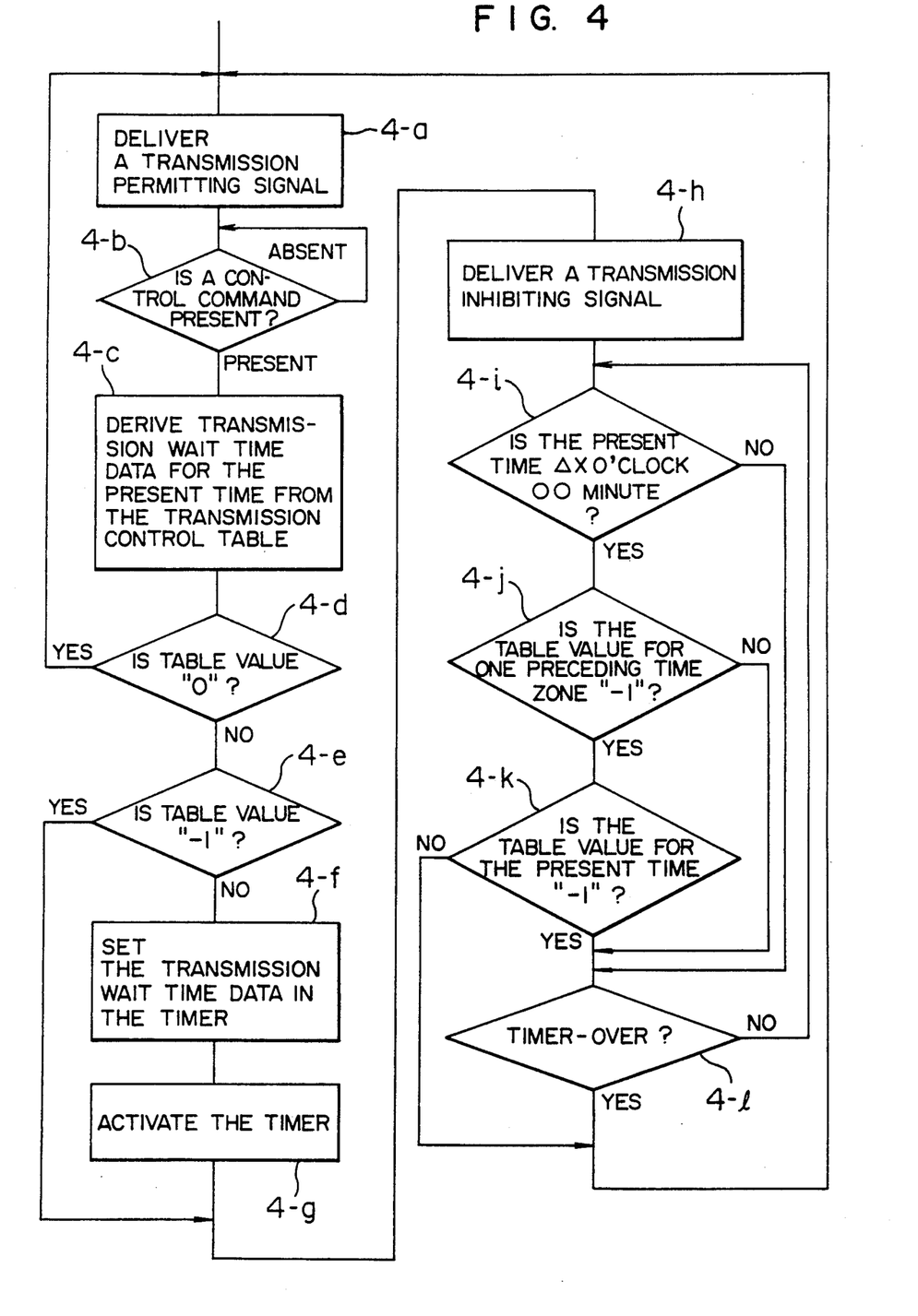
FIG. 4 is a flow chart showing the contents processed by a transmission control unit 9 of the FIG. 1 facsimile transceiver.

FIG. 4 is a flow chart showing the contents of processing in the transmission control unit 9. Referring to FIG. 4, in step 4-b, the transmission control unit 9 which has issued a transmission permitting signal to the control unit 2 awaits the delivery of a transmission control command from the control unit 2. When the transmission control command is delivered out, the transmission control unit 9 reads, in step 4-c, the present time and derives transmission wait time data corresponding to the present time from the transmission control table shown in FIG. 2. If the transmission wait time data is decided to be "0" in step 4-d, the procedure returns to step 4-a where the transmission control unit 9 delivers a transmission permitting signal and in step 4-b, the control unit 9 again awaits a transmission control command from the control unit 2. If NO is issued from the step 4-d, the procedure proceeds to step 4-e where the transmission data is decided as to whether to be "−1" and if the answer is YES, the control unit 9 delivers, in step 4-h, a transmission inhibiting signal without activating the timer 10. If the transmission wait time data is other than "0" and "−1", the control unit 9 sets, in step 4-f, the transmission wait time data in the timer 10, activates the timer 10 in step 4-g and delivers a transmission inhibiting signal in step 4-h. Under this condition, the present time is examined (step 4-i) and if it coincides with each o'clock and zero minute, a table value for the one preceding time zone and a table value for the present time are both examined (steps 4-j and 4-k). For example, when the present time is 10.00, a table value for a 9 o'clock time zone and a table value for a 10 o'clock time zone are both examined. If the table value for the one preceding time zone is "−1" and the table value for the present time is other than "−1", indicating that the transmission inhibiting time zone ends, the procedure proceeds to step 4-a where the control unit 9 delivers a transmission permitting signal and in step 4-b, the control unit 9 waits for a transmission control command. When the present time is other than each o'clock and zero minute and the condition for the termination of the transmission inhibiting time zone is not satisfied, timer 10 is checked for its being over or timer-over (termination of the transmission wait time) in step 4-1. If the timer-over is not determined, the procedure returns to step 4-i and checking of the termination of the transmission inhibiting time zone and of the time-rover is repeated. If the timer-over of the timer 10 is determined, the procedure returns to step 4-a where the control unit 9 delivers a transmission permitting signal and in step 4-b the control unit 9 again waits for a transmission control command. Through the above processing, the transmission wait time can be controlled for each time zone.

Figure 5:
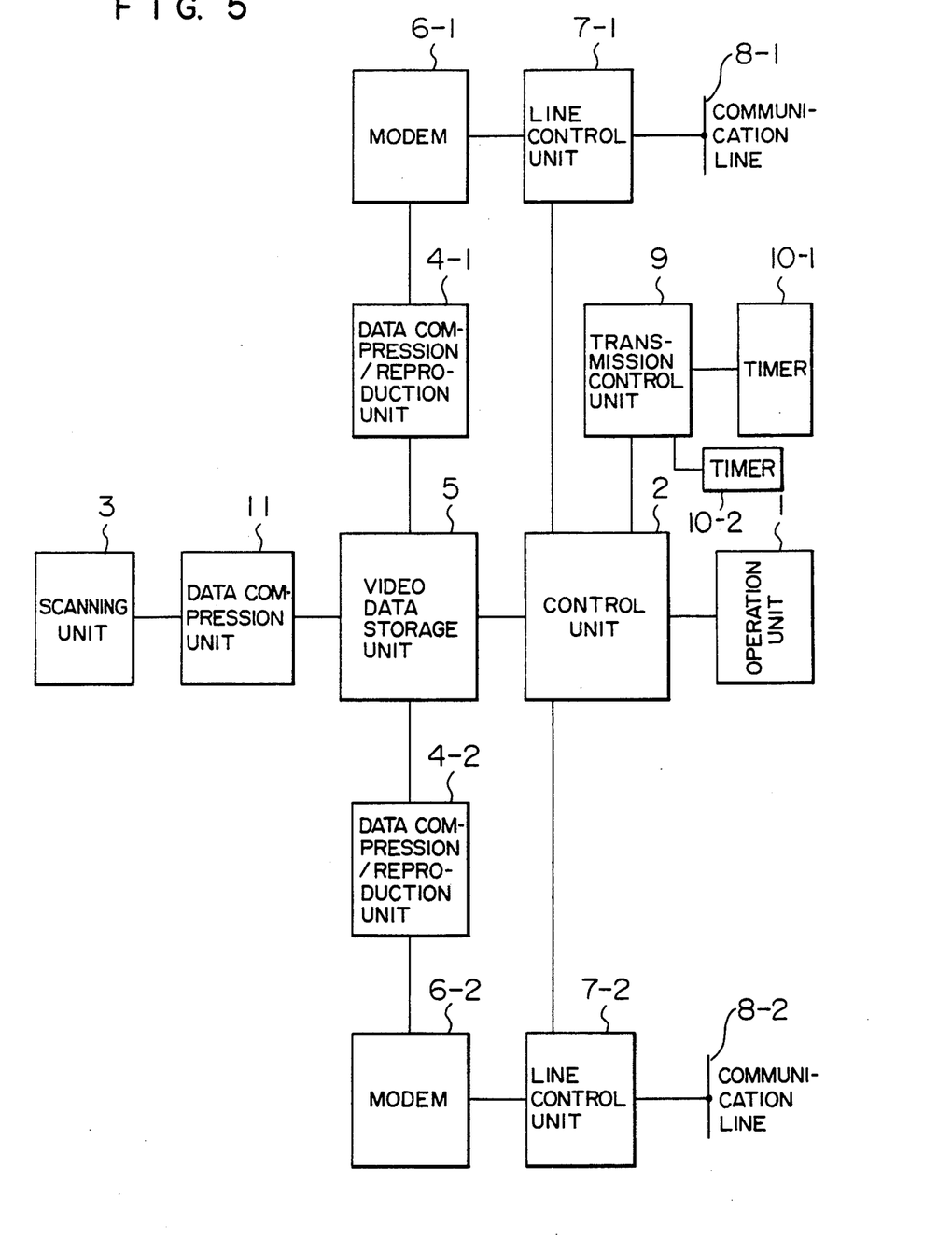
FIG. 5 is a block diagram showing a 2-line facsimile transceiver according to another embodiment of the invention.
Figure 6A:
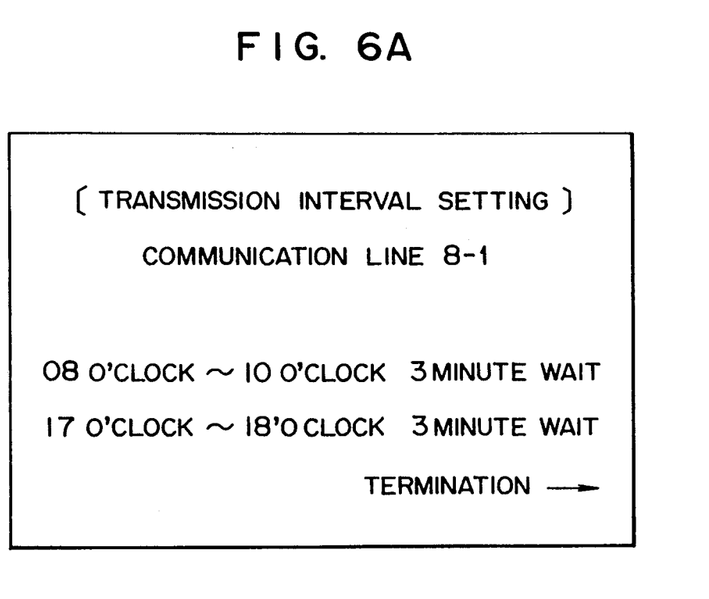
Figure 6B:
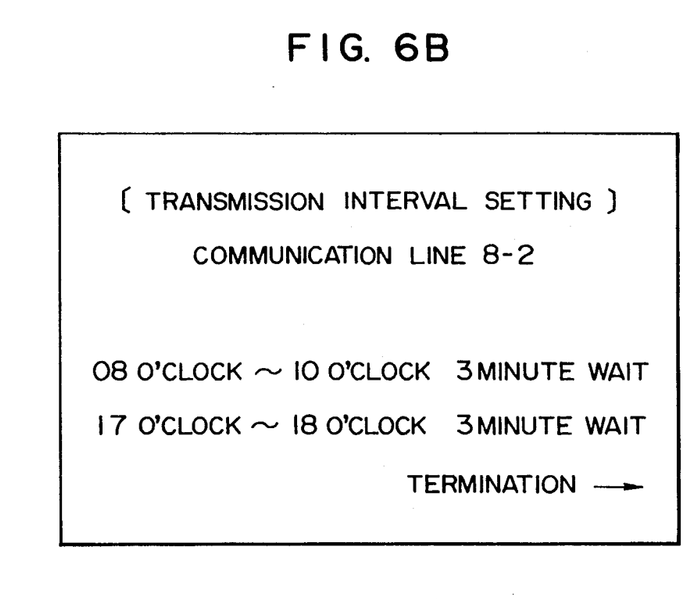

FIG. 5 shows another embodiment of the invention which is applied to a multi-line facsimile transceiver capable of connecting to a plurality of communication lines. The facsimile transceiver shown in FIG. 5 has two channels which include data compression/reproduction units 4-1, 4-2 MODEM units 6-1, 6-2 and line control units 7-1, 7-2 and which correspond to two channels of communication lines 8-1 and 8-2. A transmission control unit 9 has two transmission control tables, as shown in FIG. 2, corresponding to the two channels of communication lines in order that the transmission wait time for each time zone can be registered in respect of the individual lines, as shown in FIGS. 6A-B. Also, two timers 10-1 and 10-2 are included in the facsimile transceiver shown in FIG. 5 connected to the transmission control unit 9. The timers 10-1 and 10-2 operate in in association with the two communication lines 8-1 and 8-2 respectively. When broadcasting transmission is carried out with the transceiver constructed as above, video data read by means of a scanning unit 3 is removed of redundancy at a data compression unit 11 and then stored in a video data storage unit 5. Thereafter, a control unit 2 checks whether a transmission control unit 9 is in the transmission permitting state in connection with the line 8-1. When the control unit 9 is in the transmission inhibiting state in connection with the line 8-1, the control unit 2 waits until the control unit 9 is brought into the transmission permitting state and thereafter delivers a transmission command to the line control unit 7-1 associated with the line 8-1. Responsive to the command from the control unit 2, the line control unit 7-1 operates to dial and confirm connection to a destination. Subsequently, under the direction of a command from the control unit 2, video data is read out of the video data storage unit 5, subjected to reconstruction and recompression at the data compression/reproduction unit 4-1 as necessary, and sent to the communication line 8-1 via the MODEM unit 6-1. As shown, as a transmission to the first destination has been completed in this manner, the control unit 2 delivers to the transmission control unit 9 a transmission control command in connection with the line 8-1. Responsive to this command, the transmission control unit 9 is brought into the transmission inhibiting state in connection with the line 8-1. Concurrently with the commencement of the communication through the line 8-1, the control unit 2 checks whether the transmission control unit 9 is in the transmission permitting state in connection with the line 8-2. When the transmission control unit 9 is in the transmission inhibiting state, the control unit 2 waits until the control unit 9 is brought into the transmission permitting state in connection with the line 8-2 and thereafter delivers a transmission command to the line control unit 7-2 associated with the line 8-2 to cause the same to effect a transmission to the second destination. Subsequently, communications through the line 8-2 is carried out by using a similar means to that in the case of the line 801. Then, upon completion of the communication through the line 8-2, the control unit 2 delivers to the transmission control unit 9 a transmission control command in connection with the line 8-2. Responsive to this command, the transmission control unit 9 is brought into the transmission inhibiting state in connection with the line 8-2.

As soon as the transmission permitting state is established in connection with any one of the two lines, the control unit 2 permits a transmission through the line subject to permission and enables the above transmission processing to repeat itself until transmissions to all destinations are completed through the use of the two transmission lines.

Figure 7:
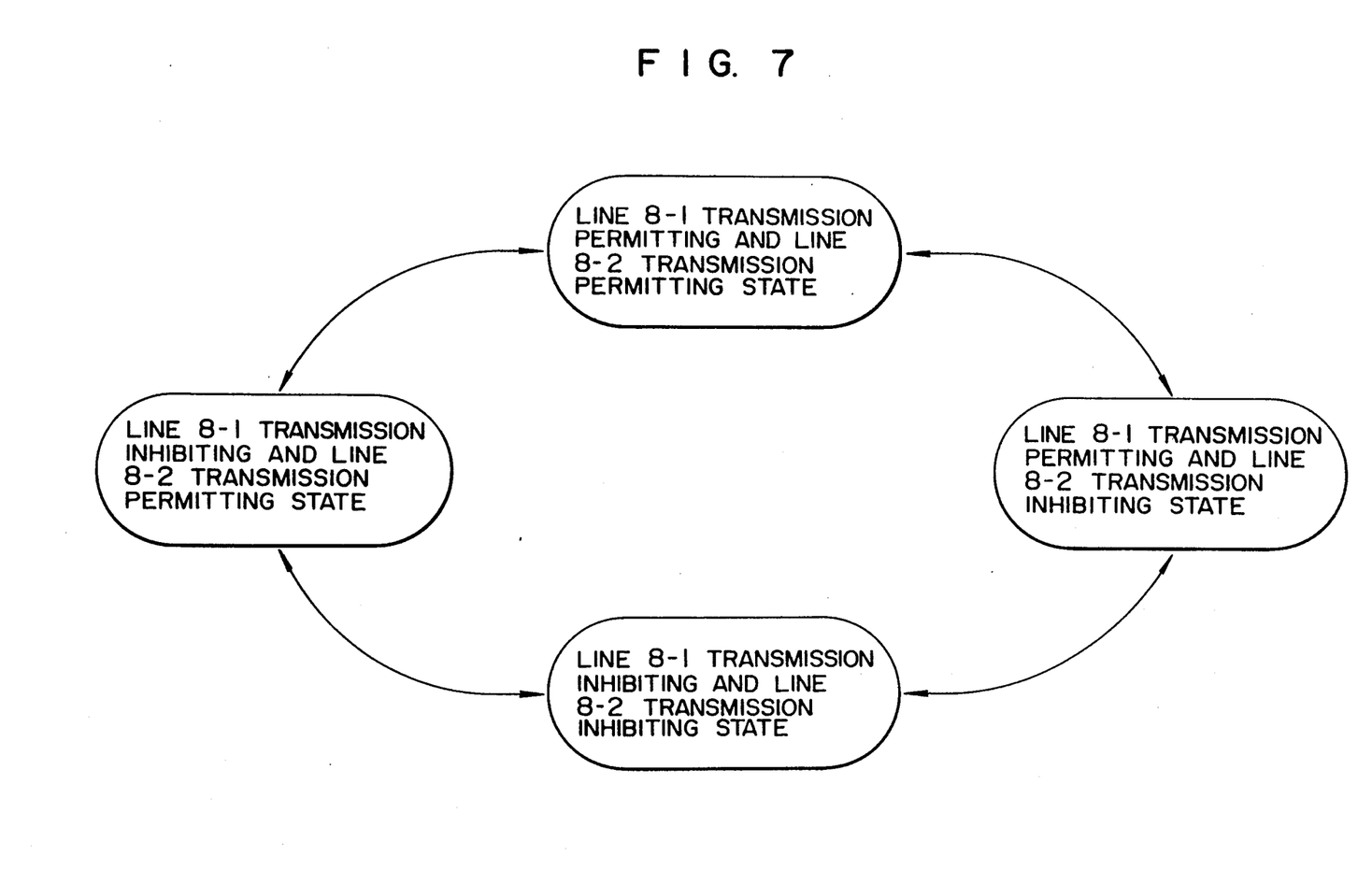
FIG. 7 is a diagram showing state transition in a transmission control unit 9 of the FIG. 5 2-line facsimile transceiver.

During the above processing, the transmission control unit 9 controls the transmission inhibiting time independently in respect of the two lines and therefore transition of state from one to another occurs as shown in FIG. 7 in the following four control states:

(1) The transmission permitting state is established for the lines 8-1 and 8-2.
(2) The transmission permitting state is established for the line 8-1 but the transmission inhibiting state is established for the line 8-2.

(3) The transmission inhibiting state is established for the line 8-1 but transmission permitting state is established for the line 8-2.
(4) The transmission inhibiting state is established for the lines 8-1 and 8-2.

Figure 8:
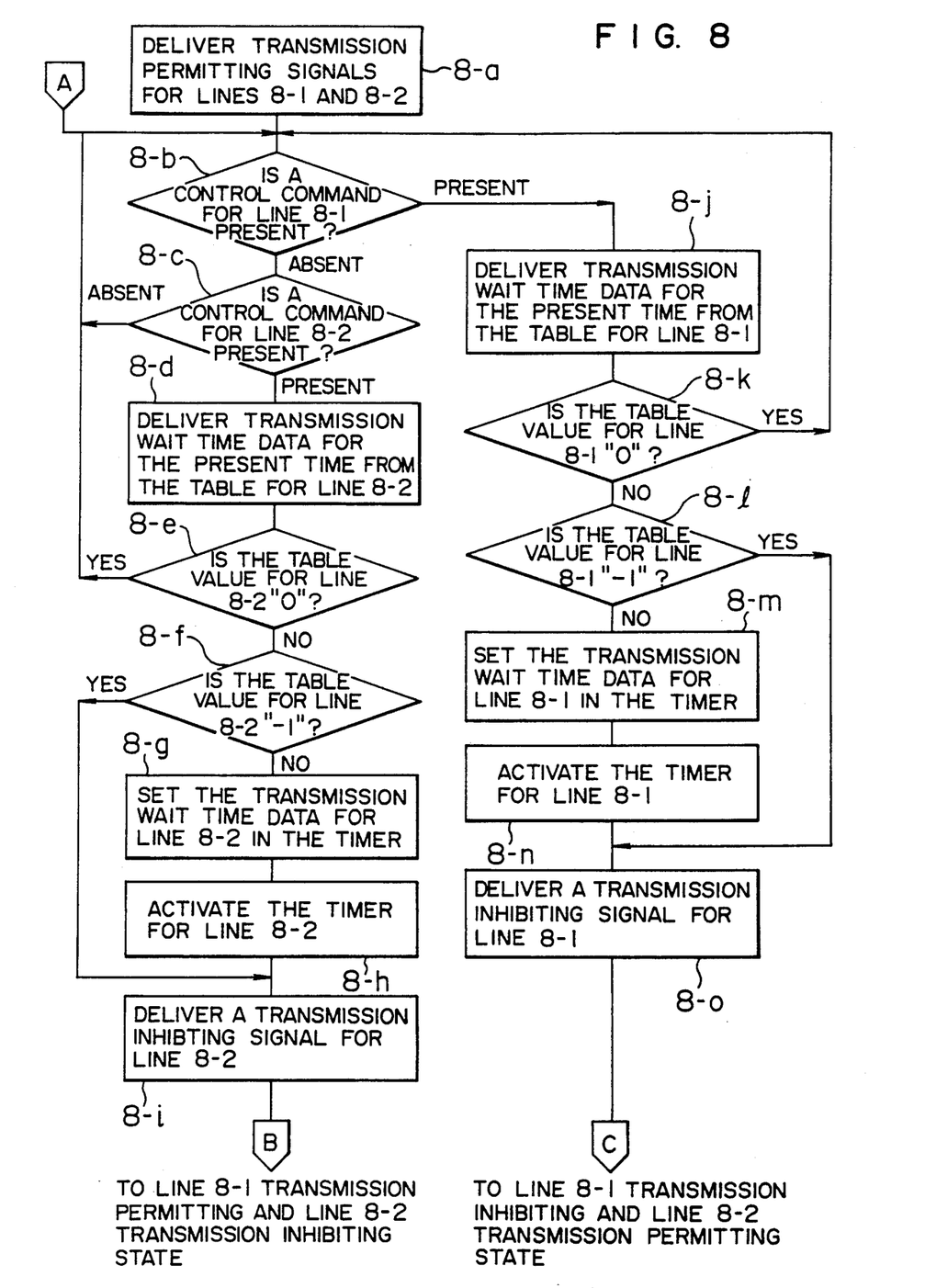
FIGS. 8, 9, 10 and 11 are flow charts showing the contents processed in the transmission control unit 9 of the FIG. 5 2-line facsimile transceiver.

In individual control states, the transmission control unit 9 processes the contents to be described below with reference to FIGS. 8 to 11. FIG. 8 shows the contents processed when the transmission permitting state is valid for the two lines. Under this condition, the transmission control unit 9 keeps waiting, in steps 8-b and 8-c, until the control unit 2 issues transmission control commands. Responsive to a transmission control command for the line 8-1 from the control unit 2, the transmission control unit 9 reads transmission wait data for the present time from the table for the line 8-1 in step 8-j. If the data is "0", the control unit 9 waits for a transmission control command from the control unit 2. If the table value is "−1", the timer for the line 8-1 will not be activated. If the table value is other than "0" and "−1", the table value is set in the timer for the line 8-1 and thereafter, in step 8-0, a transmission inhibiting signal for the line 8-1 is delivered from the control unit 9 so that the control state shifts to the line 8-1 transmission inhibiting and 8-2 line transmission permitting state. When the transmission control unit 9 waiting for the transmission control command from the control unit 2 receives a transmission control command for the line 8-2, it operates, in step 8-d, to read transmission time wait data for the present time from the table for the line 8-2. If the data is "0", the procedure returns to step 8-b where the control unit 9 awaits a transmission control command. If the table value is "−1", the timer for the line 8-2 will not be activated. If the table value is other than "0" and "−1", the table value is set in the timer for the line 8-2 and thereafter, in step 8-i, a transmission inhibiting signal for the line 8-2 is delivered from the control unit 9 so that the control state shifts to the line 8-1 transmission permitting and line 8-2 transmission inhibiting state.

Figure 9:
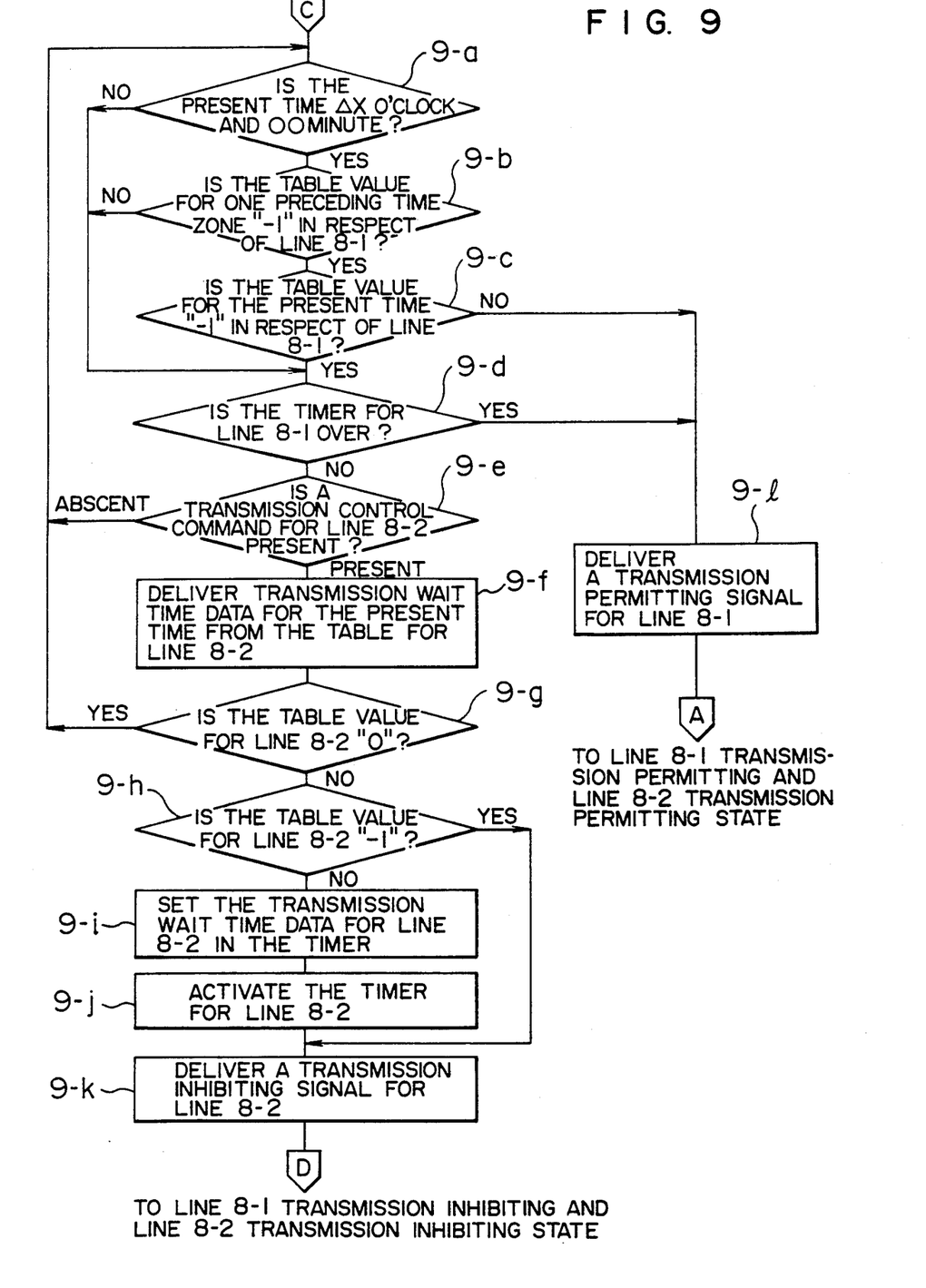

FIG. 9 shows the contents processed when the line 8-1 transmission inhibiting and line 8-2 transmission permitting state occurs. Under this condition, the control unit 9 checks, in steps 9-a, 9-b and 9-c, whether the transmission inhibiting time zone for the line 8-1 ends. If termination of the transmission inhibiting time zone is determined, a line 8-1 transmission permitting signal is delivered from the control unit 9 so that the control state shifts to the line 8-1 transmission permitting and line 8-2 transmission permitting state. If the condition for termination of the transmission inhibiting time zone is not satisfied, it is checked whether the timer for line 8-1 is over. When the timer for line 8-1 is over, a line 8-1 transmission permitting signal is delivered from the control unit 9 so that the control state shifts to the line 8-1 transmission permitting and line 8-2 transmission permitting state. When the timer for the line 8-1 is not over, the termination of the transmission inhibiting time zone for the line 8-1 is again checked reiteratively through steps 9-a, 9-b and 9-c. When receiving a transmission control command for the line 8-2 in step 9-e, the control unit 9 operates to read transmission wait time data for the present time from the table for the line 8-2 in step 9-f. If the data is "0", step 9-a and the ensuring steps are again repeated. If the table value is "−1", the timer for the line 8-2 will not be activated. If the table value is other than "0" and "−1", the timer for the line 8-2 is set with the table data and started and thereafter, in step 9-k, a line 8-2 transmission inhibiting signal is delivered from the control unit 9 so that the control state shifts to the line 8-1 and line 8-2 transmission inhibiting state.

Figure 10:
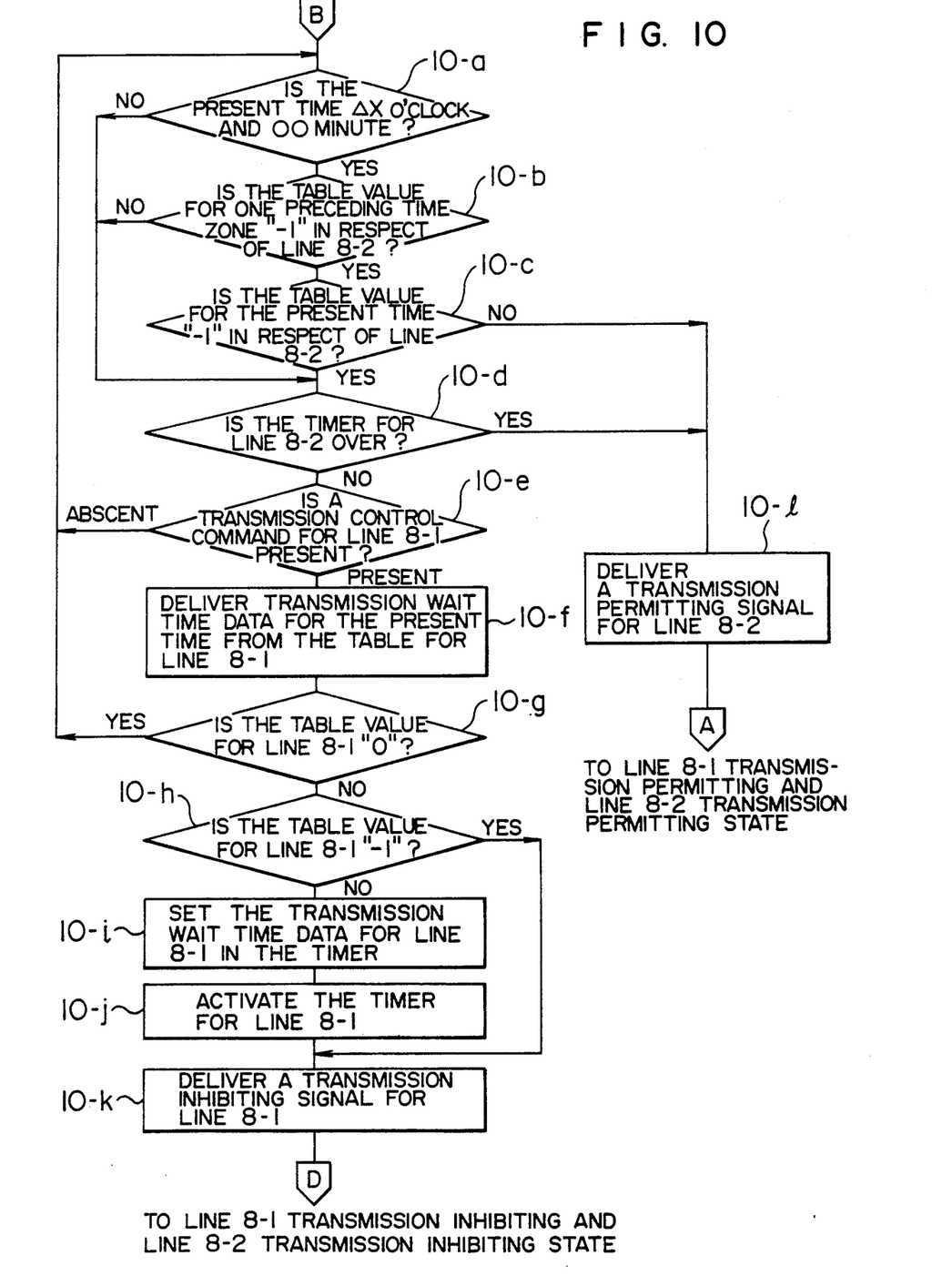

FIG. 10 shows the content processed when the line 8-1 transmission permitting and line 8-2 transmission inhibiting state occurs. This processing is the same as that effected when the processings for the line 8-1 and 8-2 in FIG. 9 are exchanged with each other.

Figure 11:
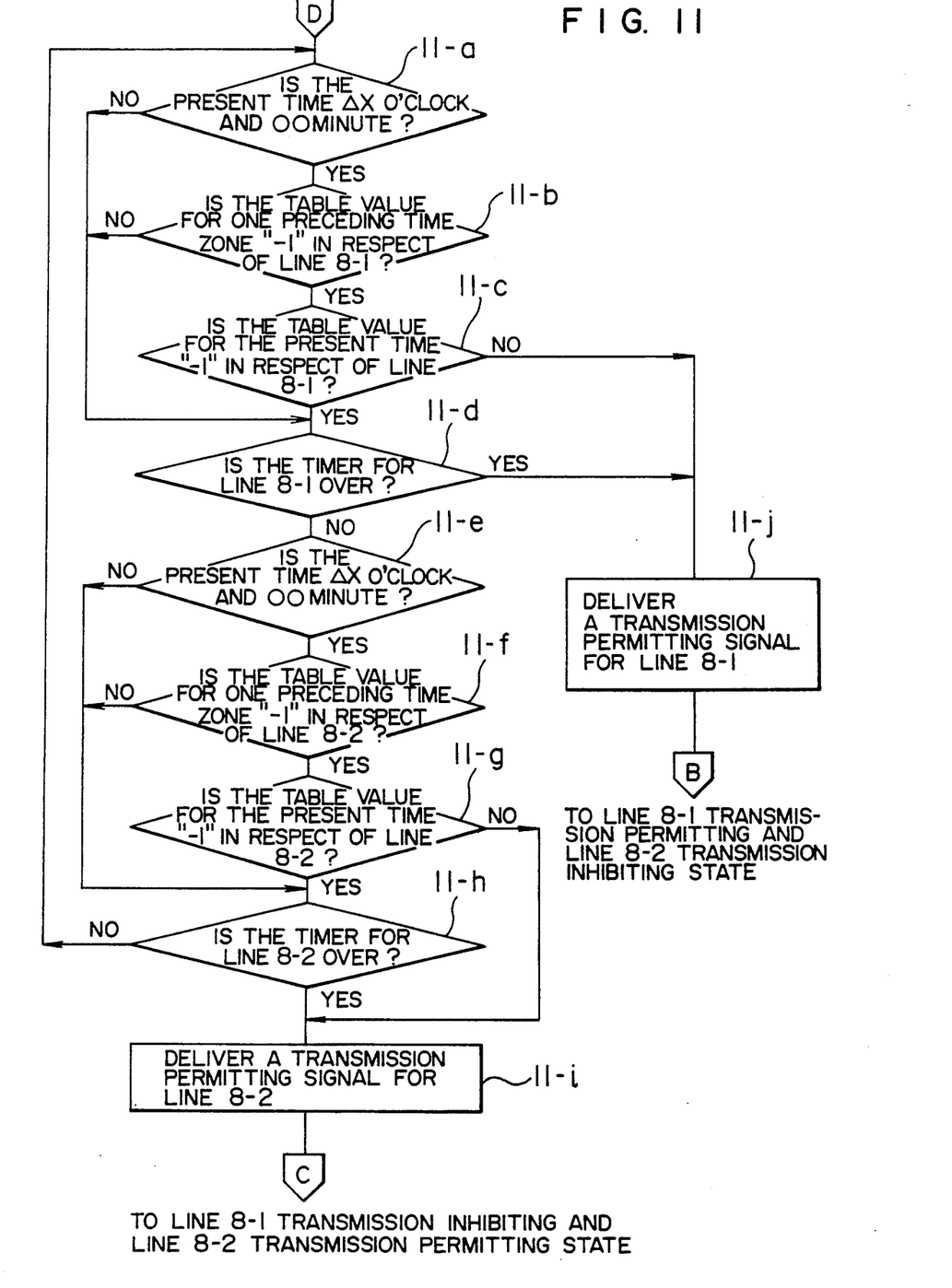

FIG. 11 shows the contents processed when the line 8-1 and line 8-2 transmission inhibiting state occurs. Under this condition, the transmission inhibiting time zone for line 8-1 is checked for its termination in steps 11-a, 11-b and 11-c and if the termination of the transmission inhibiting time zone is determined, a line 8-1 transmission permitting signal is delivered so that the control state shifts to the line 8-1 transmission permitting and line 8-2 transmission inhibiting state. If the condition for the termination of the transmission inhibiting time zone is not satisfied, it is checked in step 11-d whether the timer for the line 8-1 is over. When the timer is over, the control state shifts to the line 8-1 transmission permitting and line 8-2 transmission inhibiting state. If it is determined in step 11-d that the timer for the line 8-1 is not over, as in the case of the line 8-1, the transmission inhibiting time zone for the line 8-2 is checked for its termination in steps 11-e, 11-f and 11-g and in step 11-h, the timer for the line 8-2 is checked for its being over. If the transmission inhibiting time zone ends and the timer is over, a line 8-2 transmission permitting signal is delivered in step 11-i so that the control state shifts to the line 8-1 transmission inhibiting and line 8-2 transmission permitting state. When the above condition is not satisfied, the procedure returns to step 11-a and the termination of the transmission inhibiting time zone and the timer-over are checked repetitively in connection with the lines 8-1 and 8-2.

Through the above procedure described with reference to FIGS. 7 to 11, the transmission wait time for the individual time zones can be set in respect of each line and the transmission inhibiting time for each line can be controlled in accordance with the time for termination of a transmission through each line.

In the foregoing embodiment, the transmission inhibiting time zone can also be controlled by setting "−1" in transmission wait time data in the transmission control table.

Further, in the foregoing embodiment, by setting the same value in transmission wait time data for all of the individual time zones of the transmission control table, the transmission wait time can be controlled uniformly all the data regardless of the time zone.

Figure 12B:
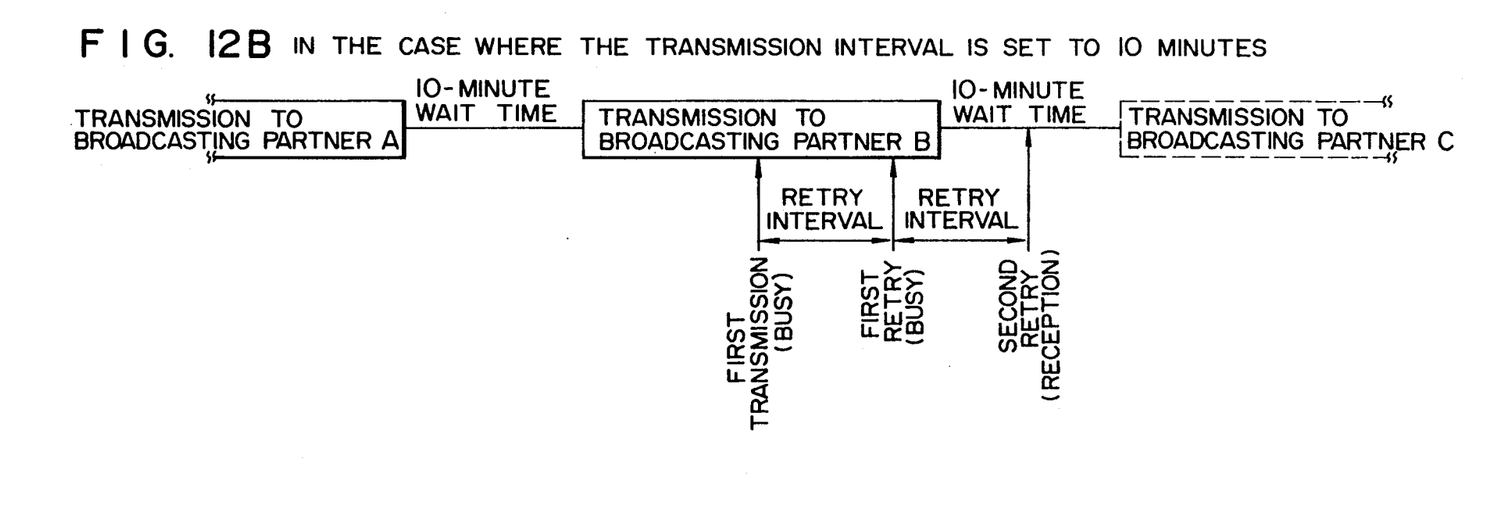

For example, assume that when a facsimile transceiver is carrying out broadcasting transmission, another automatic facsimile transceiver having the retry function transmits data to the former transceiver, as shown in FIGS. 12A–B. In this case, when the transmission wait time for broadcasting transmission is "0" as shown in FIG. 12A, indicating that the transmission inhibiting time is not involved, the busy state continues until broadcasting transmission to destinations has been completed and the former transceiver is not permitted to receive the data from the latter transceiver. But when the transmission wait time is set to, for example, 10 minutes as shown in FIG. 12B, the 10-minute transmission wait time is inserted each time that a transmission to each broadcasting transmission destination ends and therefore if the transmission wait time is so set as to be longer than the retry interval of the partner transceiver, the former transceiver can acknowledge receipt of the data intervening between adjacent broadcasting transmissions. Since the value of the transmission wait time can be set differently for the individual time zones, effective utilization of the line commensurate with utilization condition of the user can be ensured.

In addition, in the 2-line communication transceiver employing the above system, three modes including
  (1) A first mode wherein both of the two lines have zero wait time and dedicated to transmission in order to decrease the broadcasting time,
  (2) A second mode wherein one line is set for transmission inhibition so as to be reserved for emergency reception and the other line is so set as to have zero wait time and dedicated to transmission, and
  (3) A third mode wherein one line is so set as to have the transmission wait time and occasionally used for transmission to mitigate the busy state during reception and the other line has zero wait time and is dedicated to transmission, can be used properly for the individual time zones and therefore the two lines can be used efficiently in commensurate with the utilization pattern of the user.

We claim:

1. A broadcasting communication apparatus comprising:
   a scanning unit for reading a document and delivering video data;
   a data compression unit for compressing the video data;
   a memory unit for storing compressed video data from said data compression unit;
   a reproduction unit for reading the compressed video data stored in said memory unit;
   a MODEM for transmitting the video data to a communication line; and
   control means for controlling said apparatus wherein when reading the document, the video data read out of said scanning unit is stored in said memory unit through said data compression unit and in a broadcasting communication mode, the video data from said reproduction unit is transmitted to said communication line through said MODEM and during a predetermined interval of time between termination of transmission to a first destination and commencement of transmission to a second destination, transmission of video data is inhibited to establish a reception wait state during said predetermined interval of time.

2. A broadcasting communication apparatus according to claim 1 wherein said control means comprises:
   a first control unit which receives a transmission destination designated by an operation unit to set up and confirm connection of a communication line to the designated destination and after confirmation of the connection, transmits the video data from said MODEM to said communication line; and
   a second control unit connected to said first control unit for controlling said apparatus wherein in said broadcasting communication mode, the transmission of the video data is inhibited during said predetermined interval of time between termination of transmission to the first destination and commencement of transmission to the second destination to establish said reception wait state during said predetermined interval of time.

3. A broadcasting communication apparatus according to claim 2 wherein said second control unit comprises a control table in which a transmission wait time is set; and
   wherein said apparatus further comprises a timer connected to said second control unit for measuring said transmission wait time.

4. A broadcasting communication apparatus according to claim 3 wherein values of said transmission wait time in said control table of said second control unit are set to be used during predetermined transmission time zones.

5. A broadcasting communication apparatus comprising:
   a scanning unit for reading a document and delivering video data;
   a data compression unit for compressing the video data;
   a memory unit for storing compressed video data from said data compression unit;
   first and second reproduction units for reading the compressed video data stored in said memory unit;
   first and second MODEM's for transmitting the video data to communication lines; and
   control means for controlling said apparatus wherein when reading the document, the video data read out of said scanning unit is stored in said memory unit through said data compression unit and in a broadcasting communication mode, the video data from said first and second reproduction units is transmitted to said communication lines through said first and second MODEM's and during a predetermined interval of time between termination of transmission to a first destination and commencement of transmission to a second destination, transmission of video data is inhibited to establish a reception wait state during said predetermined interval of time.

6. A broadcasting communication apparatus according to claim 5 wherein said control means comprises:
   first and second control units each of which receives a transmission destination designated by an operation unit to set up and confirm connection of a corresponding one of said communication lines to the designated destination and after confirmation of the connection, transmits the video data from a corresponding one of said first and second MODEM's to said corresponding one of said communication lines; and
   a transmission control unit for controlling said first and second control units such that in said broadcasting communication mode, the transmission of the video data is inhibited during said predetermined interval of time between the termination of transmission to the second destination to establish said reception wait state during said predetermined interval of time.

7. A broadcasting communication apparatus according to claim 6 wherein said transmission control unit comprises a control table in which a transmission wait time is set; and
   wherein said apparatus further comprises a timer connected to said transmission control unit for measuring the transmission wait time.

8. A broadcasting communication apparatus according to claim 7 wherein values of said transmission wait time in said control table of said transmission control unit are to be used during predetermined transmission time zone.

9. A broadcasting communication apparatus for storing transmission video data temporarily in a memory unit and performing sequential facsimile transmission of the stored transmission video data to a plurality of destinations, said apparatus comprising:
control means for controlling said apparatus wherein transmission of the video data is inhibited during a predetermined interval of time between a transmission to a first destination and a transmission to a second destination to establish a reception wait state during said predetermined interval of time.

10. A broadcasting facsimile transceiver comprising:
control means for inhibiting, in a broadcasting communication mode, broadcasting communication during a predetermined interval of time ranging from the completion of transmission to a destination to the commencement of transmission to the succeeding destination.

11. A broadcasting communication apparatus comprising:
a scanning unit for reading a document and delivering video data;
a data compression unit for compressing the video data;
a memory unit for storing compressed video data from said data compression unit;
a reproduction unit for reading the compressed video data stored in said memory unit;
a MODEM for transmitting the video data to a communication line;
a first control unit for enabling communications to a transmission destination through said communication line; and
a second control unit for controlling said first control unit such that in a broadcasting communication mode, transmission of the video data is inhibited during a predetermined interval of time between termination of transmission to a first destination and commencement of transmission to a second destination to establish a reception wait state during said predetermined interval of time.

12. A broadcasting communication transmission control system for storing transmission data, transmitting the transmission data sequentially to a plurality of partners through a single communication line and receiving data by using said single communication line, said system comprising:
control means for inhibiting, after transmission of transmission data to a first partner, transmission of transmission data to a second partner to establish a reception wait state during said inhibiting operation, said apparatus being in said reception wait state during a transmission inhibiting time interval, and for permitting transmission of transmission data to the second partner at expiration of said predetermined transmission inhibiting time interval.

13. A broadcasting communication transmission control system according to claim 12 wherein values of said transmission inhibiting time interval are preset to be used during individual time zones and wherein at expiration of said transmission inhibiting time interval used during a time zone after termination of transmission of transmission data to a first partner, transmission of transmission data to a second partner is permitted.

14. A broadcasting communication transmission control system according to claim 13 wherein when said transmission inhibiting time interval is not set to be used during a time zone, transmission of transmission data to the second partner is not inhibited but is permitted to continue.

15. A broadcasting communication transmission control system according to claim 12 wherein a specified time zone is set to be a transmission inhibiting time zone when a time of termination of the transmission of transmission data to a partner corresponds to a beginning of said transmission inhibiting time zone, said transmission inhibiting time interval is set to range from said transmission termination time to an end of said transmission inhibiting time zone.

16. A broadcasting communication transmission control system according to claim 13 wherein a specified time zone is set to be a transmission inhibiting time zone and when a time of termination of the transmission of transmission data to a partner corresponds to a beginning of said transmission inhibiting time zone, said transmission inhibiting time interval is set to range from said transmission termination time to an end of said transmission inhibiting time zone.

17. A broadcasting communication transmission control system according to claim 14 wherein a specified time zone is set to be a transmission inhibiting time zone and when a time of termination of the transmission of transmission data to a partner corresponds to a beginning of said transmission inhibiting time zone, said transmission inhibiting time interval is set to range from said an end of said transmission termination lines the transmission inhibiting time zone.

18. A broadcasting communication transmission system for storing transmission data, transmitting the transmission data sequentially to a plurality of partners through a plurality of communication lines and receiving data by using said plurality of communication lines, said system comprising:
control means for inhibiting, after transmission of transmission data to a first partner through one of said plurality of communication lines, transmission of transmission data to a second partner through one of said plurality of communication lines to establish a reception wait state during said inhibiting operation, said system being in said reception wait state during a transmission inhibiting time intended for said one communication line and permitting transmission of transmission data to the second partner through when said transmission inhibiting time interval preset for ends.

19. A broadcasting communication transmission system according to claim 18 wherein values of transmission inhibiting time intervals are preset for use during individual time zones in correspondence to said plurality of communication lines and at expiration of a transmission inhibiting time preset for a time zone occurring after a time of termination of transmission of transmission data to a first partner through one of said plurality of communication lines, transmission of transmission data to a second partner through said one communication line is permitted.

20. A broadcasting communication transmission system according to claim 19 wherein when a transmission inhibiting time interval is not set for use in a time zone in respect to one of said plurality of communication lines, transmission of transmission data to the second partner through said one communication line is not inhibited but is permitted to continue.

21. A broadcasting communication transmission system according to claim 18 wherein a specified time zone in respect of a specified communication line is set to be a transmission inhibiting time zone and when a time of termination of transmission of transmission data to the first partner through said specified communication line corresponds to a beginning time of said transmission inhibiting time zone in respect of said specified communication line, said transmission inhibiting time interval is set to range from said transmission termination time to an ending time of said transmission inhibiting time zone in respect of said specified communication line.

22. A broadcasting communication transmission system according to claim 19 wherein a specified time zone in respect of a specified communication line is set to be a transmission inhibiting time zone and when a time of termination of transmission of transmission data to the first partner through said specified communication line corresponds to a beginning time of said transmission inhibiting time zone in respect of said specified communication line, said transmission inhibiting time interval is set to range from said transmission termination time to an ending time of said transmission inhibiting time zone in respect of said specified communication line.

23. A broadcasting communication transmission system according to claim 20 wherein a specified time zone in respect of a specified communication line is set to be a transmission inhibiting time zone and when a time of termination of transmission of transmission data to the first partner through said specified communication line corresponds to a beginning time of said transmission inhibiting time zone in respect of said specified communication line, said transmission inhibiting time interval is set to range from said transmission termination time to an ending time of said transmission inhibiting time zone in respect of said specified communication line.

24. A broadcasting communication apparatus for storing transmission data and transmitting the stored transmission data sequentially to a plurality of partners, said apparatus comprising:

transmission control means for inhibiting transmission during a predetermined interval of time to establish a transmission wait state during said predetermined interval of time in accordance with a preset condition.

* * * * *